United States Patent
Kant

(10) Patent No.: US 9,028,081 B2
(45) Date of Patent: May 12, 2015

(54) REMOVABLE WINDOW INSULATOR

(71) Applicant: Flatiron Research Group, LLC, Boulder, CO (US)

(72) Inventor: Rishi Kant, Boulder, CO (US)

(73) Assignee: Flatiron Research Group, LLC, Boulder, CO (US)

( * ) Notice: Subject to any disclaimer, the term of this patent is extended or adjusted under 35 U.S.C. 154(b) by 347 days.

(21) Appl. No.: 13/690,782

(22) Filed: Nov. 30, 2012

(65) Prior Publication Data

US 2013/0141809 A1    Jun. 6, 2013

Related U.S. Application Data

(60) Provisional application No. 61/629,915, filed on Dec. 1, 2011.

(51) Int. Cl.
| | | |
|---|---|---|
| *G02B 5/08* | (2006.01) | |
| *G02B 7/182* | (2006.01) | |
| *C03C 17/36* | (2006.01) | |
| *C03C 17/38* | (2006.01) | |

(52) U.S. Cl.
CPC ............. *G02B 7/182* (2013.01); *C03C 17/366* (2013.01); *C03C 17/38* (2013.01)

(58) Field of Classification Search
CPC ........ G02B 7/182; G02B 5/08; G02B 5/0808; G02B 5/0858; G02B 5/10
USPC .................................. 359/883, 884; 428/354
See application file for complete search history.

(56) References Cited

U.S. PATENT DOCUMENTS

| | | |
|---|---|---|
| 4,040,210 A | 8/1977 | Land |
| 4,068,428 A | 1/1978 | Peterson, III |
| 4,198,796 A | 4/1980 | Foster |
| 4,221,091 A | 9/1980 | Ganse et al. |
| 4,255,908 A | 3/1981 | Rosenberg |
| 4,343,110 A | 8/1982 | Thompson |
| 4,346,132 A | 8/1982 | Cheng et al. |
| 4,351,137 A | 9/1982 | Enyart et al. |
| 4,357,187 A | 11/1982 | Stanley et al. |
| 4,391,865 A | 7/1983 | Constance |
| 4,416,096 A | 11/1983 | Schuster et al. |
| 4,439,964 A | 4/1984 | Chu |

(Continued)

FOREIGN PATENT DOCUMENTS

| | | |
|---|---|---|
| CN | 1916311 A | 2/2007 |
| CN | 201047123 Y | 4/2008 |

(Continued)

OTHER PUBLICATIONS

Website http://www.1WindowQuilts.com. Copyright© 2010 Window Quilt Insulated Shades. All content.

*Primary Examiner* — Euncha Cherry
(74) *Attorney, Agent, or Firm* — Vivacqua Law, PLLC; Raymond J. Vivacqua; John M. Card

(57) ABSTRACT

A window insulator includes a coupling layer, a reflective layer, and a layer of dielectric material disposed between the coupling layer and the reflective layer. The combination of the coupling layer, the reflective layer, and the layer of dielectric material forms a capacitor that facilitates the release of electrons from the reflective layer and the transfer of the free electrons from the reflective layer to the coupling layer when the window insulator is exposed to radiant energy.

20 Claims, 5 Drawing Sheets

(56) References Cited

U.S. PATENT DOCUMENTS

| | | |
|---|---|---|
| 4,470,222 A | 9/1984 | Killingsworth |
| 4,473,980 A | 10/1984 | Foster |
| 4,486,990 A | 12/1984 | Bauch |
| 4,513,548 A | 4/1985 | Parker |
| 4,514,945 A | 5/1985 | Menchetti et al. |
| 4,531,562 A | 7/1985 | Swanson |
| 4,544,587 A | 10/1985 | Nesbitt |
| 4,562,675 A | 1/1986 | Baigas, Jr. et al. |
| 4,625,786 A | 12/1986 | Carter et al. |
| 4,647,488 A | 3/1987 | Schnebly et al. |
| 4,649,681 A | 3/1987 | Eisele |
| 4,699,842 A | 10/1987 | Jorgensen et al. |
| 4,944,548 A | 7/1990 | Payne et al. |
| 5,027,574 A | 7/1991 | Phillip |
| 5,108,811 A | 4/1992 | Shippen |
| 5,203,129 A | 4/1993 | Johnson |
| 5,207,040 A | 5/1993 | Lovell |
| 5,271,980 A | 12/1993 | Bell |
| 5,314,226 A | 5/1994 | Tovar |
| 5,368,085 A | 11/1994 | Ruparelia |
| 5,466,500 A | 11/1995 | Pluim |
| 5,570,734 A | 11/1996 | Wu |
| 5,778,958 A | 7/1998 | Stebner |
| 5,794,404 A | 8/1998 | Kim |
| 5,909,763 A | 6/1999 | Link et al. |
| 5,937,595 A | 8/1999 | Miller |
| 6,006,481 A | 12/1999 | Jacobs |
| 6,138,433 A | 10/2000 | Ridge |
| 6,197,419 B1 | 3/2001 | Hyde et al. |
| 6,318,440 B1 | 11/2001 | Cordrey et al. |
| 6,325,344 B1 | 12/2001 | Gary et al. |
| 6,848,492 B2 | 2/2005 | Thomas |
| 6,863,112 B1 | 3/2005 | Ayers et al. |
| 6,877,286 B2 | 4/2005 | Johnson |
| 6,918,426 B1 | 7/2005 | Westby |
| 7,228,662 B1 | 6/2007 | John |
| 2002/0144483 A1 | 10/2002 | Shippen |
| 2007/0256373 A1 | 11/2007 | Collard |
| 2008/0155911 A1 | 7/2008 | Reuter |
| 2009/0039763 A1* | 2/2009 | Chien et al. .............. 313/503 |
| 2009/0193756 A1 | 8/2009 | Kant et al. |
| 2009/0242809 A1 | 10/2009 | Choju et al. |

FOREIGN PATENT DOCUMENTS

| | | |
|---|---|---|
| EP | 2346092 A1 | 7/2011 |
| JP | 08260832 A | 10/1996 |
| JP | 03164180 U | 11/2010 |
| KR | 2010112464 A | 10/2010 |

\* cited by examiner

REMOVABLE WINDOW INSULATOR

RELATED APPLICATION

This application claims the benefit of U.S. Provisional Application No. 61/629,915 filed on Dec. 1, 2011, the entire contents of which are incorporated herein by reference.

FIELD

This application relates to removable window insulators.

BACKGROUND

The statements in this section merely provide background information related to the present disclosure and may or may not constitute prior art.

With the increasing cost associated with energy as well as the increased environmental concerns associated with fuel, there is an increasing demand to develop solutions that can decrease energy demands. Heating and cooling costs are the highest component of energy cost. In a typical household heating and cooling cost are about 45% to the total energy cost. With fuel cost rising and increased environmental awareness, there is a need to improvise ways to reduce energy consumption and to reduce emission of greenhouse gases.

During winter months, windows and other fenestrations typically account for highest heat loss through them and the outside temperature, $T_{out}$, is typically cooler than the desired comfortable temperature inside the building, i.e., $T_{desired} > T_{out}$. In order to maintain the comfortable temperature inside the building some sort of heating device is used which raises the temperature in the interior of the building to $T_{inside}$ and maintains it at this level by replacing the heat lost through the windows or similar openings. The heat loss is governed by the laws of physics and thermodynamics that dictate that the heat flows from higher temperature, $T_{inside}$ to lower temperature, $T_{out}$. If this lost heat is not replaced, the temperature inside will start to fall and will eventually become equal to the colder temperature, $T_{out}$. Thus in order to maintain a comfortable temperature, $T_{inside} > T_{out}$, the continuous use of a heating device is necessary (see FIG. 1).

FIG. 1 shows a cross-sectional view of a window 104 installed in a building. The window 104 separates the outside 101 from the interior 100 of the building. The window 104 held in place by a window frame 103 that is installed in a wall 102. A furnace or other heating device 105 attempts to maintain the interior temperature of the building at a desired interior temperature $T_{inside}$.

For a given size window 103, the amount of heat loss per unit area of the window generally depends on two parameters; a U-factor and the difference between the inside and outside temperatures, $T_{inside} - T_{out}$. Generally, heat loss can be characterized as:

$$\dot{q} = -k(T_{inside} - T_{out}) \quad (1)$$

where:
$\dot{q}$ is the heat loss per unit time; and
k=the thermal conductance.

The temperature difference ($T_{inside} - T_{out}$) is the driving force behind the heat loss (transfer). If k=0, then the material is called a perfect insulator and $\dot{q}$=0. However, the conductance, k can be very small but not equal to zero. As equation (1) shows, for a given temperature difference, the smaller k is, the smaller the heat loss. To understand the function of an insulator, consider FIG. 2.

In FIG. 2, L represents the thickness of the insulator 200 and A represents the area covered by the insulator (for example it can be the area of a window). The temperature $T_1$ is the warmer side and k is the conductance of the insulating material.

For this case equation (1) is rewritten as, $$k = \frac{\dot{q}}{-(T_1 - T_2)} \quad (2)$$

From equation (2) it is seen that as long as there is a temperature difference, when k=0, $\dot{q}$=0. Furthermore when k is small, $\dot{q}$ is also small. Equation (2) can also be expressed as:

$$\kappa = \frac{\dot{q}}{-(T_1 - T_2)A/L} \quad (3)$$

The constant, $\kappa$ is called the thermal conductivity and $1/\kappa$ is called the thermal resistivity, and is defined as:

$$\frac{1}{\kappa} = \frac{(T_2 - T_1)A}{\dot{q}L} \quad (4)$$

The quantity $\kappa/L$ is called the U-factor of the insulator, the inverse of which is called the R-value. The R-value is a measure of a building material's thermal resistance typically used in industry. Insulators with a small U-factor (high R-value) reduce the heat transfer. As the definition of the U-factor suggests that in order to have a small U-factor, the insulator must have greater thickness, L, or smaller conductance (poor conductor of heat), $\kappa$ or both. Equation (4) suggests that the smaller the U-factor (larger R-value) the smaller the heat flow across A. Thus, use of insulators having a high R-value reduces the heat transfer resulting in less heat lost to the outside when the interior of the building is heated and less heat gained from outside when the same is cooled.

Most contemporary buildings in the United States have double pane, or so-called insulated windows and often these windows are tinted to control the amount of radiant heat transmitted through the window. Two pane tinted windows have the so-called R-value of approximately 2. This low R-value causes substantial heat transfer across the window panes. If somehow the heat transfer across the windows can be mitigated, the net result would be a substantial reduction in energy usage either when the building is cooled during the summer months or when the building is heated during the winter months. It should be appreciated that "window" is used for all possible openings including doors, such as the patio glass doors and the like.

When an insulator is not present, as shown in FIG. 1, the heat loss, $\dot{q}_{loss}$ to the outside in the winter months will be greater compared to the case when an insulator 300 is present as shown in FIG. 3. The window insulator 300 coupled to the window 104 reduces the U-factor of the opening thus reducing the heat transfer (loss) to the outside in winter months. Thus, when the window insulator is present, more heat is retained in the interior. The burning time of the furnace will be less. Hence the use of a window insulator results in cost savings and less green-house gases will be released into the atmosphere.

In the summer months, when $T_{out}$ is greater than $T_{inside}$, the heat transfer takes place from outside into the interior of the living space. The influx of heat raises the temperature of the living space. The heat flow continues until $T_{out}=T_{inside}$. To cool the interior of the building, heat should be removed from the interior. This is customarily accomplished by an air-conditioning unit 106 (FIG. 4). The window insulator 300 in summer months reduces the heat entering from the outside to inside due to conduction. However, the window insulator 300 fails to prevent heat gain due to thermal radiation. Radiative heat transfer is more prevalent during the summer when the temperature outside, $T_{out}$ is greater than the temperature inside, $T_{inside}$. Generally, window insulators do not address this issue. Therefore, the temperature inside the building can still be significantly increased due to radiation heat gain from the sun even when these insulators are in place.

Use of curtain hanging devices are typically employed with the aforementioned insulators. Often these devices conflict with the existing mounting devices or fixtures. Furthermore, additional fixtures or mounting device may not be aesthetically pleasing. Accordingly, there is a need for an insulating window screen that can be mounted on the window without any devices or fixture, which will result in a space saving footprint and little or no cost and labor associated with such equipment.

SUMMARY

A window insulator includes a coupling layer, a reflective layer, and a layer of dielectric material disposed between the coupling layer and the reflective layer. The combination of the coupling layer, the reflective layer, and the layer of dielectric material forms a capacitor that facilitates the release of electrons from the reflective layer and the transfer of the free electrons from the reflective layer to the coupling layer when the window insulator is exposed to radiant energy.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings.

DESCRIPTION

The following description is merely exemplary in nature and is not intended to limit the present disclosure, application, or uses.

Referring now to FIGS. 5 through 8, a removable window insulator, for example, as identified at 400, is described in accordance with the principles of the present invention. The window insulator is directed to an adhesive-less insulating window screen that adheres to a window without use of adhesives or glues and remains on the window pane unless removed by a user.

Certain implementations of the window insulators described below employ thin films, such as, for example, films made of a plastic. In accordance with the principles of the present invention, these thin films adhere to surfaces because of electrostatic effects.

Electrostatic effects or static electricity is the confinement of excess charges of either polarity. When an excess of either positive or negative charges are confined into a small volume, which is located near an excess charge of the opposite polarity, mutual attraction occurs between the charges within that volume.

Many non-conducting materials have the ability to confine electric charges within them or on their surfaces when such charges are made available to them. Such materials are referred to as dielectric insulators. The degree to which dielectric insulators are capable of being polarized is characterized by their dielectric constants. Some dielectric insulators have an affinity for positive charges while others have an affinity for the negative charges. Examples of materials that have affinity for positive charges include, for example, soda glass (commonly used for glass in windows), polyurethane foam, sorbothane, Nylon etc. Examples of dielectric insulators that have affinity for negative charges include, for example, acrylic (polymethyl metacrylate), styrene (butadiene rubber), polyethylene terephthalate (PET such as Mylar), polyimides, silicones, neoprene (polychloroprene), polyvinyl chloride (PVC), Teflon etc., with some of these materials having a larger affinity for negative charges than other materials.

Note that there are several mechanisms that make negatively charged electrons available. For example, when two materials are rubbed together, one surface of one material having an affinity for negative electric acquires electrons from the other material and becomes negatively charged. If, on the other hand, one of the materials has an affinity for positive charges, it gives off electrons more easily. The electricity so produced is called static electricity. Note that most conductors (such as, for example, metals) do not retain static electricity. Whereas, mechanical handling (e.g. rubbing) of the aforementioned thin films produces static electricity.

Figure 1:
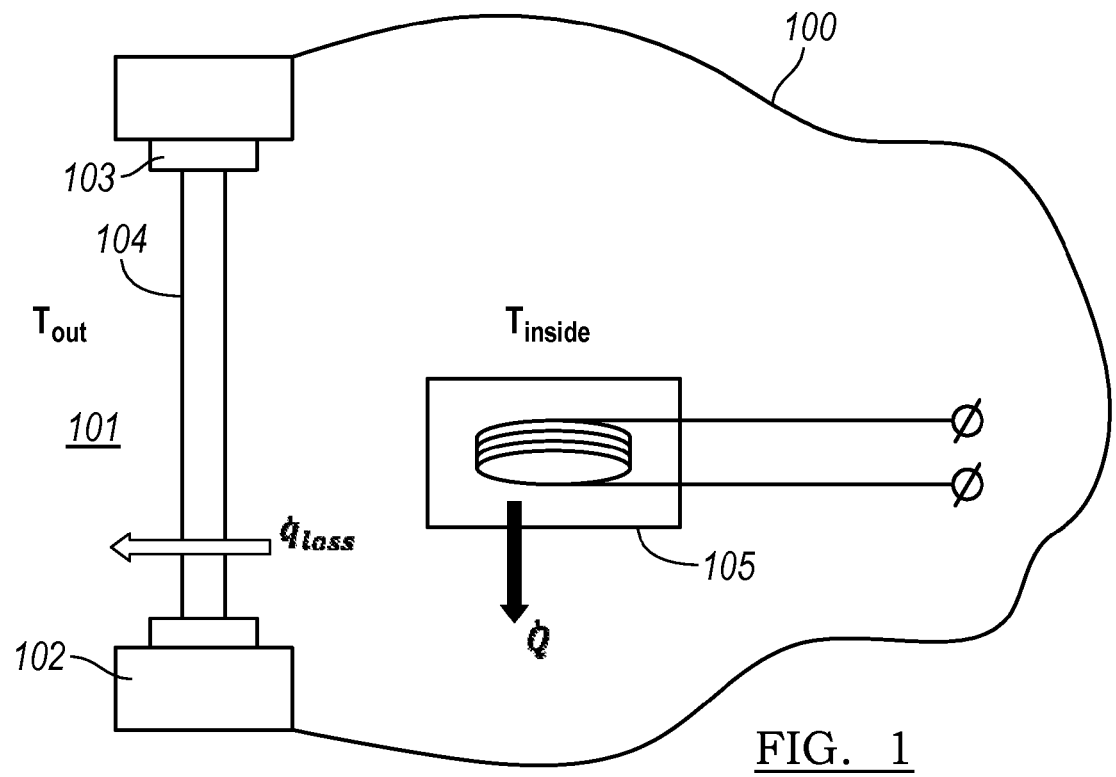
FIG. 1 shows a cross sectional view of a window without an insulator.
Figure 2:
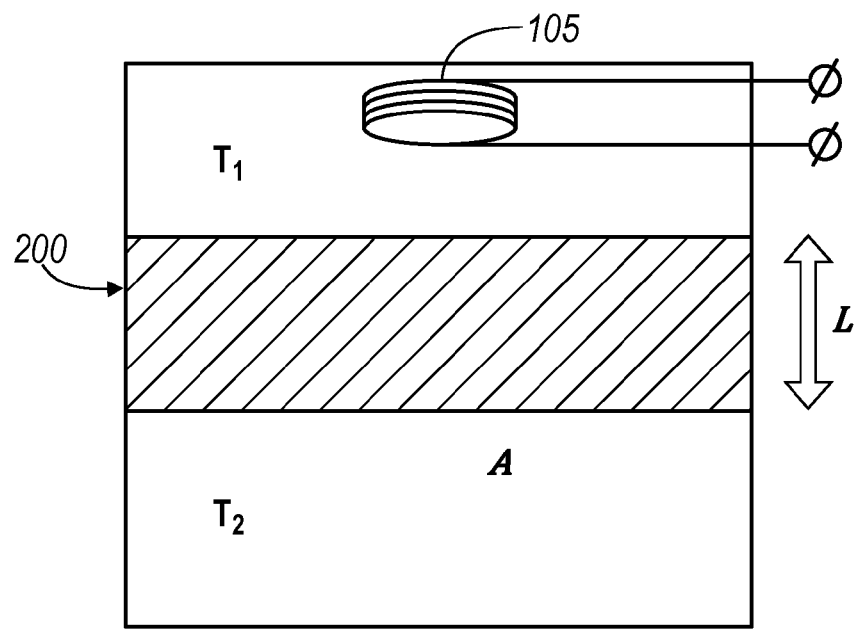
FIG. 2 depicts the general principles of an insulator.
Figure 3:
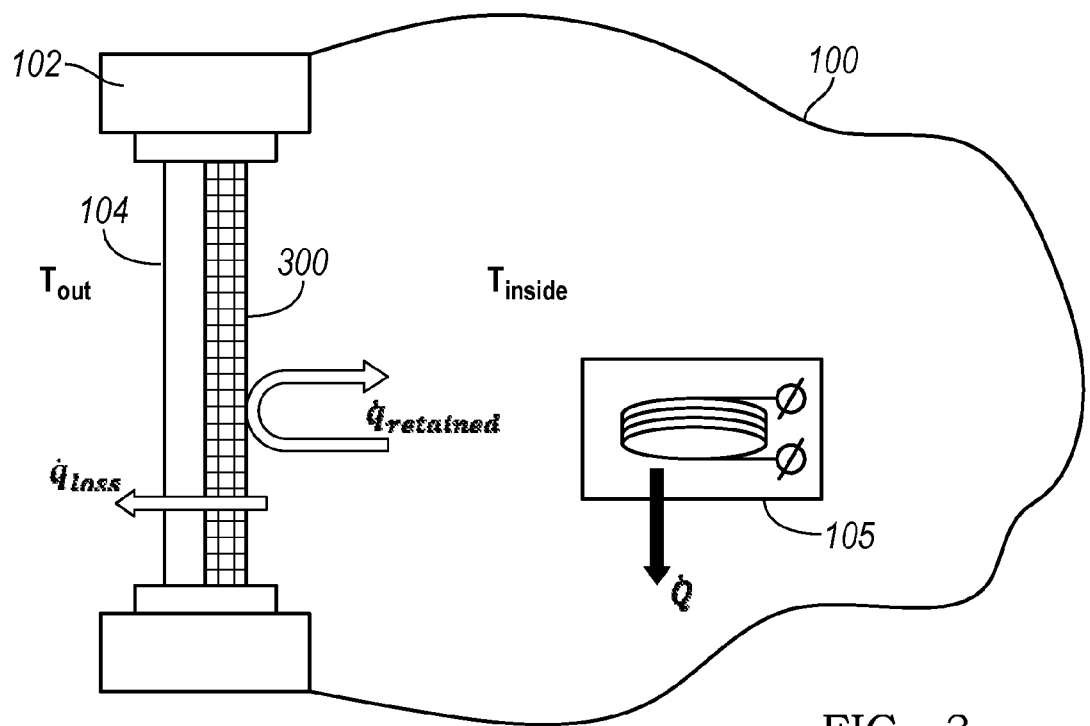
FIG. 3 shows the heat transfer through a window with a window insulator when the inside temperature is greater than the outside temperature.
Figure 4:
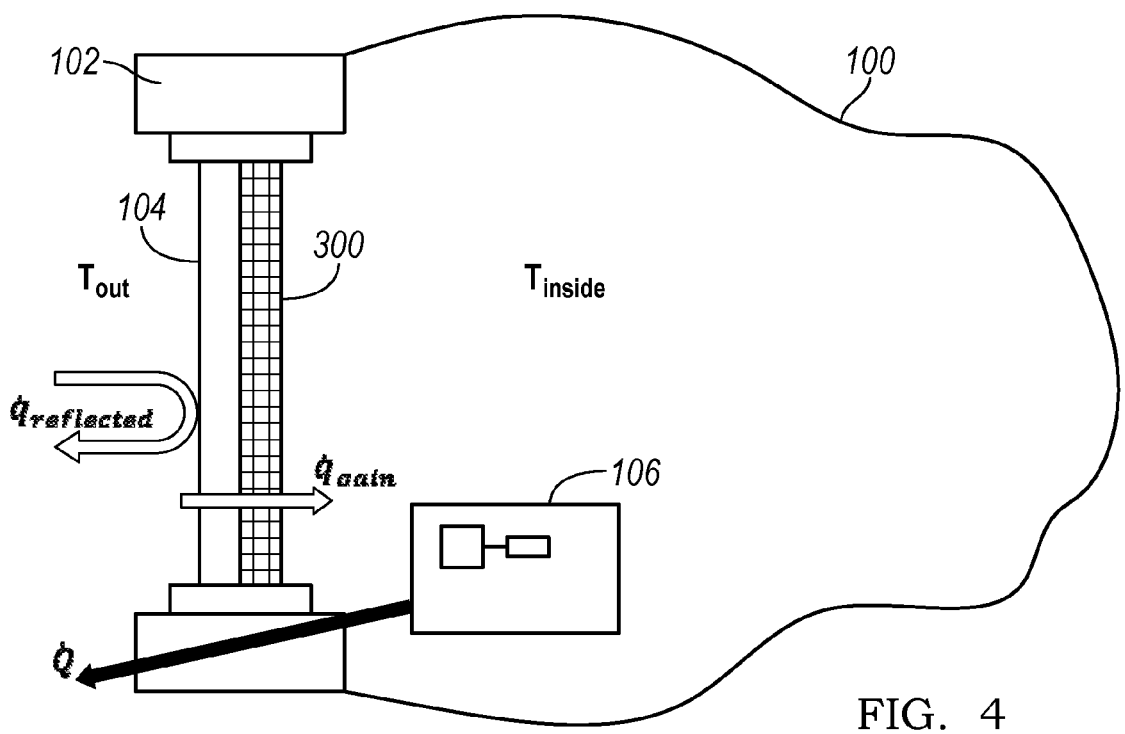
FIG. 4 shows the heat transfer through a window with a window insulator when the outside temperature is greater than the inside temperature.
Figure 5:
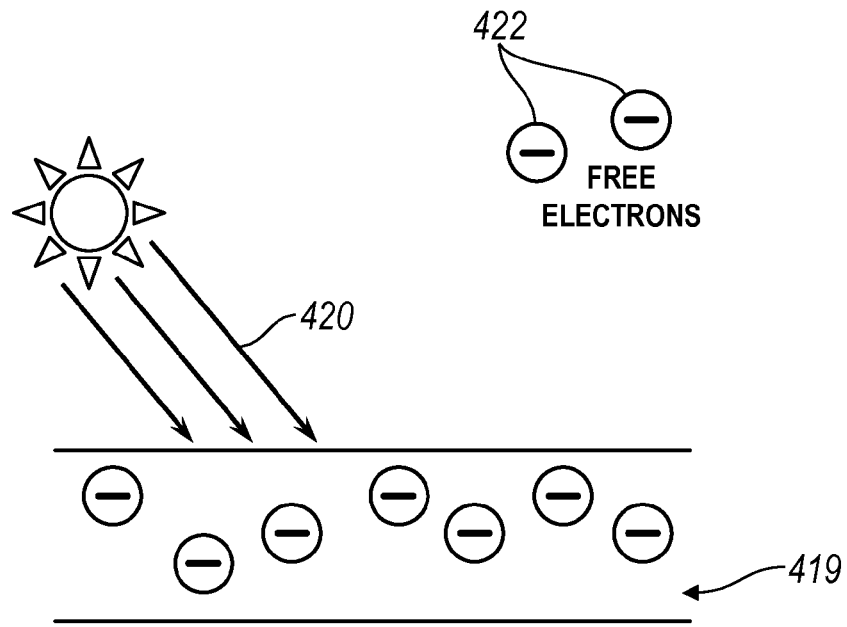
FIG. 5 depicts the principles of the photoelectric effect.
Figure 6:
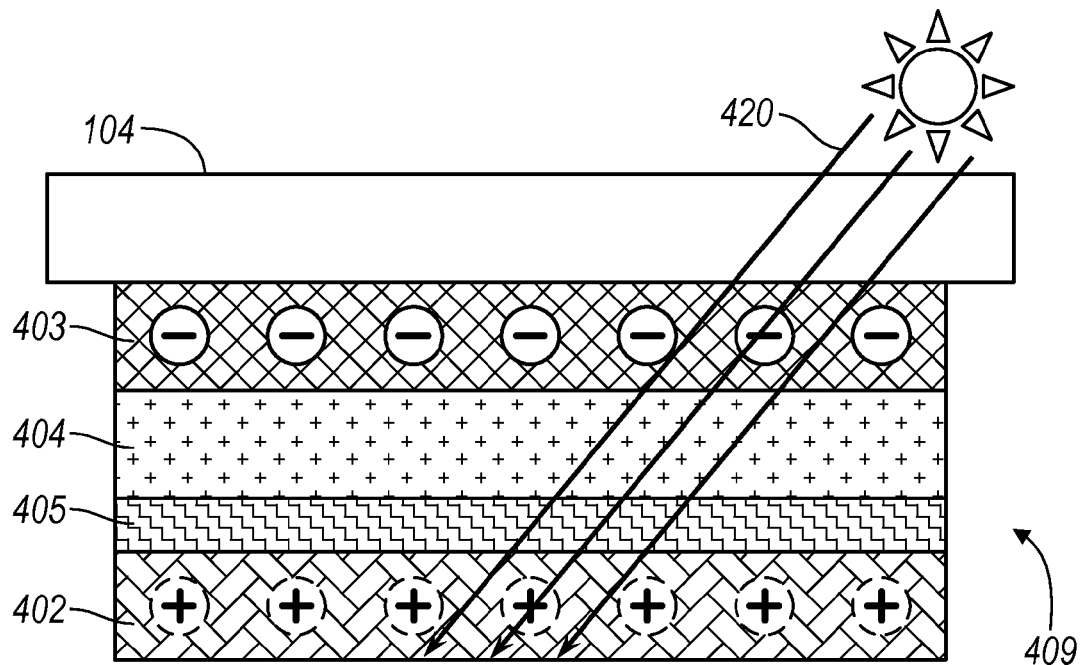
FIG. 6 shows a cross-sectional view of a coupling layer with a reflective layer in accordance with the principles of the present invention.

Electrons can also be released from certain materials by other mechanisms. Specifically, the phenomenon in which electrons are released from a material when it absorbs radiant energy is called the photoelectric effect. For example, as shown in FIG. 5, when light, such as sunlight 420, falls on a metal plate/film 419, it causes the ejection of electrons from the metal plate/film as free electrons. Accordingly, when sunlight 420 falls on a reflecting layer 419, for example, a metal (such as aluminum), the reflecting layer 419 becomes positive as the layer 419 releases electrons 422. The release of electrons also occurs if the radiation is in the wavelength range of ultraviolet radiation (solar radiation also contains some UV radiation), X rays, or gamma rays. Accordingly, the photoelectric effect occurs when the reflecting layer 419 is exposed to solar light as well as other forms of radiant energy. The emitting surface may be a solid, liquid, or gas, and the emitted particles may be electrons and other sub particles.

Figure 8:
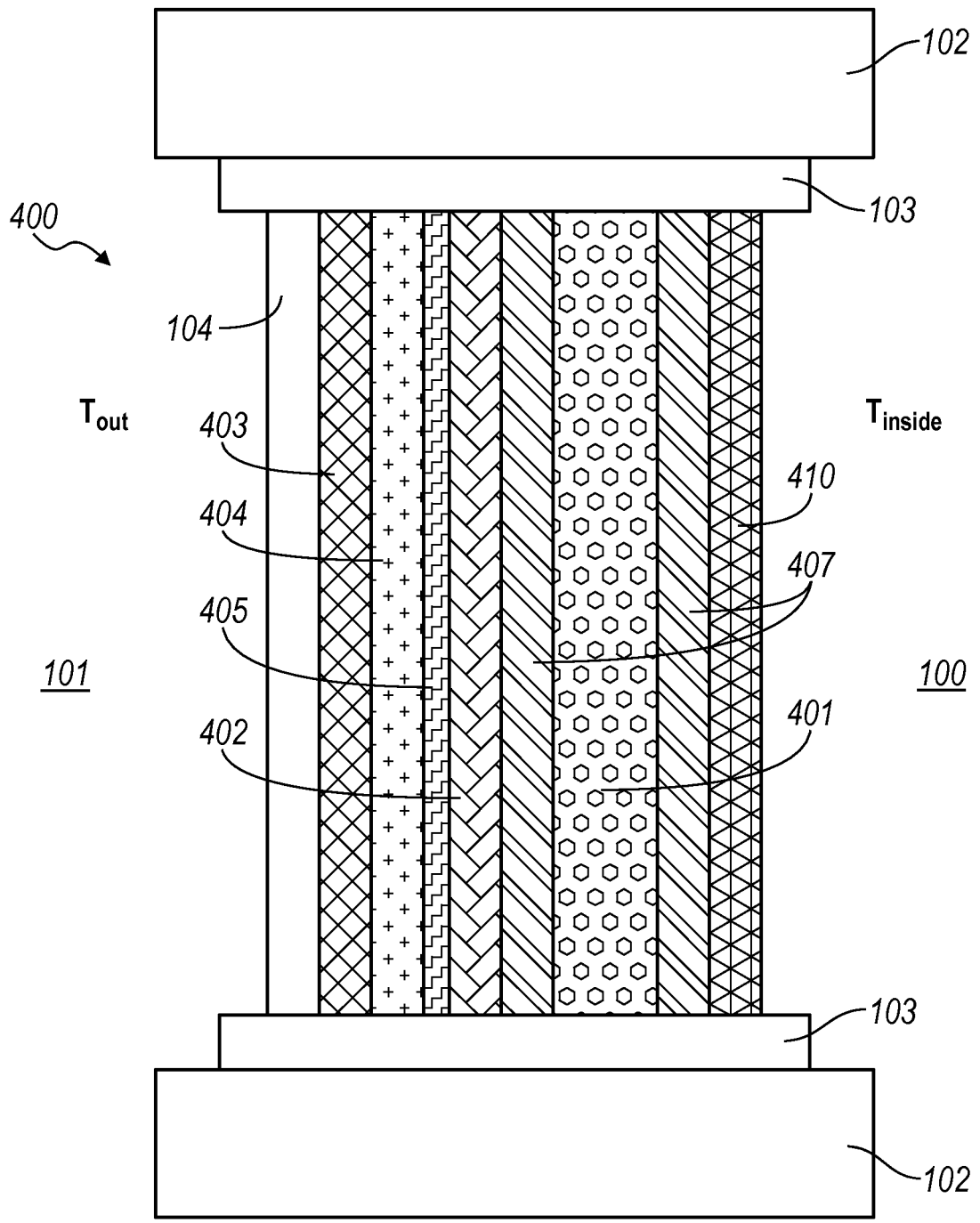
FIG. 8 shows the window insulator of FIG. 7 coupled to a window in accordance with the principles of the present invention.

FIG. 8 shows a removable window insulator 400 in accordance with the principles of the present invention. The window insulator 400 includes multiple layers that are coupled or bonded together. In a particular arrangement, the window insulator 400 includes a first layer 401, a second layer 402, and at least a third layer 403. The layers may be coupled or bonded together using any known means including adhesives, bonding, lamination, etc. According to certain arrangements, the layers of the window insulator 400 may be permanently laminated together. The lamination may be accomplished by using an adhesive film, such as pressure sensitive or spray-on adhesives, or the lamination can be made by heat bonding methods. In another arrangement, the layers may also be quilted together by stitching. There also may be a gap between the layers to further improve the window insulator's thermal resistance.

In FIG. 8, an adhesive layer 407 is provided between the first layer 401 and the second layer 402, and another adhesive layer 404 is provided between the second layer 402 and the third layer 403. Although the layers 404 and 407 are referred to as the "adhesive" layers, it should be appreciated that the layers 404 and 407 may not include an adhesive. Rather, the layers 404 and 407 may include any material suitable for coupling the various layers of the window insulator 400 together.

It should be appreciated that the layers are not shown to scale. This is merely to aid in an understanding in the various layers of the window insulator 400. In practice, the layers will generally be much thinner than shown and the adhesive layers 404 and 407 may not be visible to the naked eye.

In a particular arrangement, the first layer 401 includes a thermal conduction insulating material to reduce the conduction of heat through a window. Therefore, the first layer 401 may be referred to as an insulating layer. This layer may include any number of insulating materials. Closed cell foam, such as polyethylene foam, open cell foams, such as polyester, or fibrous insulations such as glass or cotton fibers may be employed for example. There are numerous other materials that may be employed for the insulating layer 401 and the specific examples provided should not limit the scope of the present invention. The choice of the insulating material for the insulating layer 401 may be determined by the climate of the area where it is to be used. In colder climates a thicker insulating material may be more desirable whereas in moderate climates, thinner insulating materials may be sufficient. Ideally these insulating materials have a small thermal conductivity k.

The second layer 402 of the window insulator 400 includes a reflecting material. Therefore, the second layer 402 may be referred to as a reflecting layer. The reflecting layer 402 may include a reflective film, for example. One of the functions of the reflecting layer 402 is to reflect radiant heat back to the outside. This reduces the solar heat gain coefficient (SHGC) of the window insulator 400. The SHGC measures how well a product blocks heat caused by sunlight. The reflecting layer 402 may be, for example, aluminum foil, or a metal (such as aluminum) directly deposited on a substrate. Other suitable reflective materials may also be employed and the specific materials mentioned should not limit the scope of the present invention. The reflective film may also be deposited directly on the insulating layer 401.

In addition to the reflecting layer 402 reflecting heat away from the interior of the building, the reflecting layer 402 can reflect thermal radiation away from the insulating layer 401, which can prevent the insulating layer 401 from absorbing heat.

Turning now to the third layer 403, this layer is adapted to couple the window insulator 400 to the glass surface of the window 104, the window frame 103, or the wall 102, for example. Therefore, the third layer 403 may be referred to, for example as a coupling layer or a surface coupling layer. The coupling layer 403 can be adapted to couple to any desired surface and the particular examples listed above should not limit the scope of the present invention. Furthermore, in certain arrangements, the coupling layer 403 allows the window insulator 400 to temporarily and repeatedly be coupled to the desired surface. For example, the coupling layer 403 allows the window insulator 400 to adhere to the glass surface of the window 104 as closely as possible. The coupling layer 403 allows the window insulator 400 to stay coupled to the glass surface 104 until a user physically removes it. The coupling layer 403 may be coupled directly to the reflecting layer 402 or indirectly to the reflecting layer 402 as described below.

The coupling layer 403 may include any number of different forms. In various arrangements, the coupling layer is made of a material with an affinity for negative charges. According to some arrangements, the coupling layer 403 includes a plastic such as a thin film of polyvinyl chloride (PVC), low density polyethylene (LDPE) or polyvinylidene chloride (PVdC). This film couples to glass and other smooth surfaces through mechanisms such as electro-static attraction, vacuum, adhesion or cohesion. These films attach themselves to smooth non-conducting surfaces such as a glass window pane because they generate a coulomb electrostatic charge upon mechanical handling. The window insulator 400 can be attached or removed from the glazing an infinite number of times using such a thin film layer. The coupling layer 403 may be a substantially transparent material, such that the coupling layer 403 can be substantially the same size as the insulating and reflecting layers 401, 402 without inhibiting the reflective characteristics of the reflecting layer 402.

FIG. 8 shows the window insulator 400 coupled to the window 104 in accordance with the principles of the present invention. Accordingly, the reflecting layer 402 is exposed to the window 104. Therefore, thermal radiation can be reflected back through the window 104 and away from the insulation layer 401 rather than being absorbed by the insulation layer 401. Therefore, it is desirable for the coupling layer 403 and the adhesive layer 404 to be substantially transparent materials such that at least a portion of the reflecting layer 402 is exposed to the window 104 when the window insulator 400 is in place on the window 104. Note that an optional layer 410 may be coupled or bonded to the reflecting layer 402 with another adhesive layer 407 or may be directly laminated to the reflecting layer 401. This layer 410 can provide a decorative cover for the window insulator 400. Depending on the particular material chosen for the layer 410, it may also function as a convection barrier to minimize air motion in the conductive insulating layer 401. The adhesive layers 407 can be any suitable adhesive such as, for example, rubberized adhesives.

As mentioned previously, the removable window insulator 400 does not require any adhesives or mechanical hardware for the window insulator 400 to be attached itself to the window 104. The attachment of the window insulator 400 to the window 104 is accomplished with the use of a coupling component 409 (FIG. 6) that adheres to glass or any other nonconductor that has an affinity for positive charges. In certain arrangements, the coupling component is formed by the juxtaposition of the coupling layer 403 and the reflecting layer 402 that are separated by a thin layer of dielectric material that facilitates the transfer of free electrons from the reflecting layer 402 to the coupling layer 403. More particularly, the reflecting layer 402, which may be any suitable metal such as the vacuum-deposited metallized layer as mentioned previously, forms a positively charged plate of a capacitor. Accordingly, when the reflecting layer 402 is coupled or bonded to the coupling layer 403 with the adhesive layer 404 that acts as a dielectric, the combination of the layers forms a capacitor that stores electric charges, so that the negatively charged coupling layer 403 provides adhesive-less adherence with the window 104 that has affinity for positive charges. In certain arrangements, the adhesive layer 404 can be a plasticized polymer or a co-polyimide adhesive (that is, a plasticized polymer with polyimides, both of which are dielectrics). The adhesive layer may be a permeable medium to provide transfer/passage of electrons through it to the coupling layer 403.

The supply of electrons from the reflecting layer is generated because of the photoelectric effect as described earlier with reference to FIG. 5. Hence, when sunlight falls 420 on the metallized reflecting layer 402, it releases electrons to the space that surrounds the reflecting layer 402. Note that the sunlight 420 may include visible light as well as other forms of radiant energy as described previously.

In a particular arrangement, the metallized reflecting layer 402 is coupled with another dielectric layer 405, which, in turn, is coupled to the coupling layer 403 with the layer of adhesive 404. The dielectric layer 405 can be PET, such as Mylar. Note that the reflecting layer 402 can be a separate layer from the dielectric layer 405 or the reflecting layer 402 can be the combination of deposited metallized material on a dielectric medium, which is coupled to the coupling layer 403 with the layer of adhesive 404. The dielectric layer 405 has an affinity for the negative charges released from the reflecting layer 402 so that it acquires the ejected electrons from the reflecting layer 402. For the coupling component 409 to act as a capacitor, the surfaces of opposite polarity, that is, the coupling layer 403 and the reflective layer 402, are spaced apart. The coupling layer 403, which has a greater affinity for negative charges than the adhesive layer 404 and the dielectric layer 405, is separated from the dielectric layer 405 by the layer of adhesive 404, which allows for the electrons ejected from the reflecting layer 402 to migrate from the dielectric layer 405 through the adhesive layer 404 to the coupling layer 403. In certain arrangements, the coupling layer 403 is made of a specially formulated vinyl compound (PVC).

Figure 7:
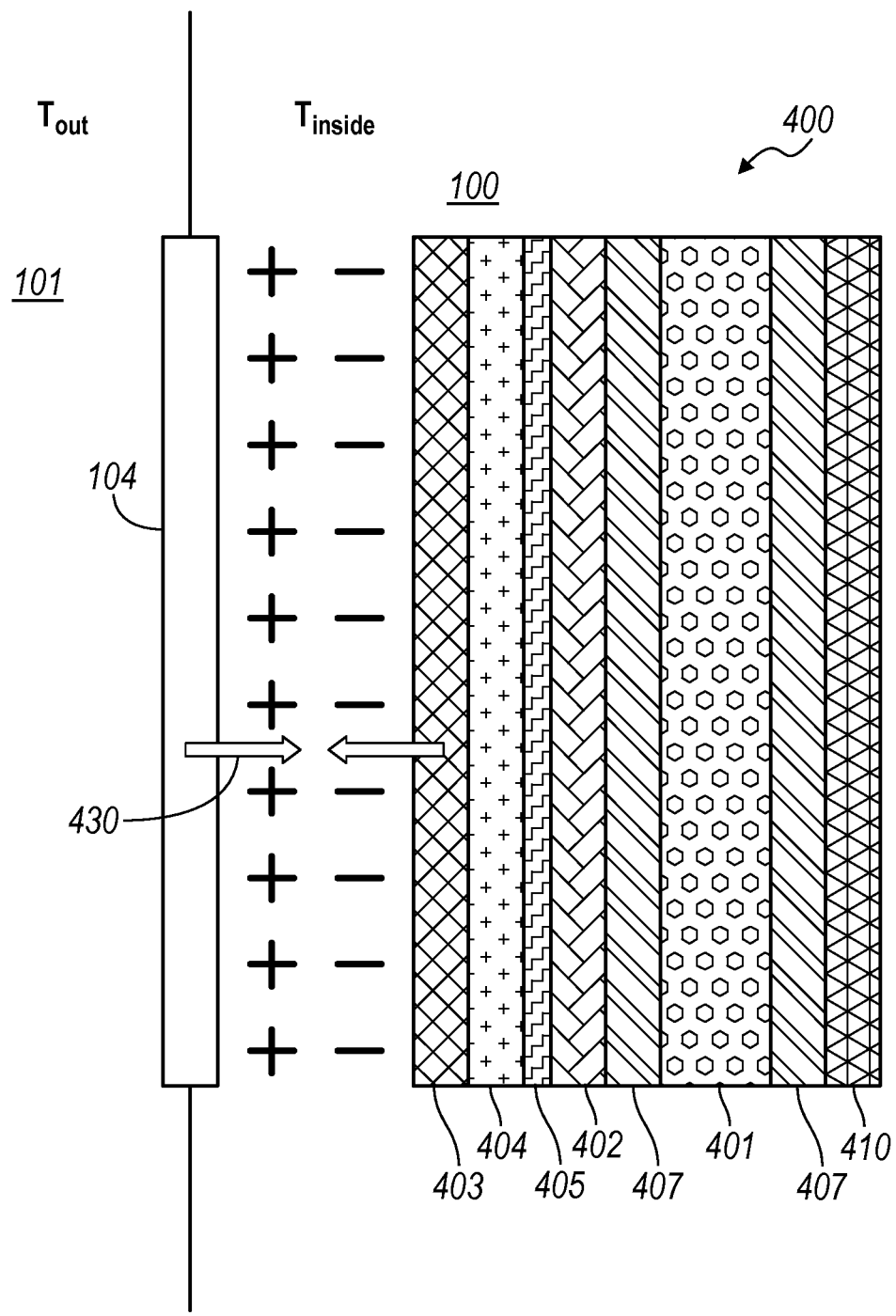
FIG. 7 shows a cross-sectional view of a window insulator in accordance with the principles of the present invention.

In sum, the positive surface of the metallized reflecting layer 402 and the negative surface of the coupling layer 403 are separated by a dielectric medium that includes the dielectric layer 405 and the adhesive layer 404 so that the condition for creating a capacitor is met. Thus, when the coupling component 409 is exposed to sunlight 420 and/or rubbed, the coupling layer 403 becomes negatively charged and remains negatively charged because the window 104 has an affinity to positive charges. Hence, the negatively charged coupling layer 403 and the positively charged window 104 create an attractive force 430 that adheres the window insulator 400 to the window 104 as shown in FIG. 7. Since the glass for the window 104 has an affinity for positive charges and does not accept electrons from the coupling layer 403, the coupling layer 403 remains charged (that is, it does not discharge). Note that glass for windows is generally a soda glass, which has an affinity for positive charges; that is, the glass gives off electrons to become positively charged.

Further note that slight cleaning of the window pane 104 before putting the window insulator 400 on the window 104, for example, by rubbing the window with a material such as wool: (1) can remove any oily thin film that may have formed on the glass that could possibly prevent the window insulated panel to adhere to the glass, and (2) generates a positive charge on the surface of the glass so that there is an incipiency of force of attraction between the glass and the window insulator blanket.

The metalized reflecting layer 402 serves other functions as well. For example, the reflecting layer 402 reflects the incoming solar radiation 420 back to the outside, to prevent solar heat gain (SHG) in the summer, because it is directly exposed to the sunlight, and the reflecting layer 402 redirects infra-red heat back to the interior of a building to keep the interior warm in the winter.

It should be appreciated that the coupling layer 403 may not occupy the entire shape of the insulator 400. For example, in some arrangements, the coupling layer 403 can include one or more patches of arbitrary shape attached to the dielectric layer 405 intermittently at the periphery of the patch by the adhesive 404. The intermittent deployment of adhesive 404 is to allow the pocket of air in between the coupling layer 403 and the dielectric layer 405 to escape. In yet another arrangement, the coupling layer 403 includes bleed holes to allow the air to escape. In another arrangement, the coupling layer 403 may be continuously adhesively bonded to the dielectric layer 405 except for certain patches, which gives rise to the possibility that the coupling layer 403 may be screen printed for the desired pleasing appearance.

In various arrangements, the window insulator 400 may include a relatively flexible component, thereby allowing the window insulator 400 to be rolled up or folded for storage purposes. In some arrangements, the window insulator 400 may be secured along one of the edges of a window, for example, and unrolled into place. This may allow for easier use of the window insulator 400 while also providing a way for storing the window insulator 400 when not in use.

The description of the invention is merely exemplary in nature and variations that do not depart from the gist of the invention are intended to be within the scope of the invention. Such variations are not to be regarded as a departure from the spirit and scope of the invention.

What is claimed is:

1. A window insulator comprising:
   a coupling layer; and
   a reflective layer including a dielectric medium bonded to the coupling layer and further including a metallized layer, the dielectric medium being disposed between the metalized layer and coupling layer and being spaced apart from the coupling layer,
   the combination of the coupling layer and the reflective layer forming a capacitor that stores electric charges, the metalized layer releasing free electrons when radiant energy falls on the metallized layer, the free electrons being acquired by the dielectric medium and migrating to the coupling layer such that the coupling layer becomes negatively charged when the window insulator is exposed to radiant energy.

2. The window insulator of claim 1 wherein the metallized layer is vacuum-deposited onto the dielectric medium.

3. The window insulator of claim 2 wherein the metallized layer is formed from a metal.

4. The window insulator of claim 1 further comprising an adhesive layer that bonds the dielectric medium to the coupling layer.

5. The window insulator of claim 4 wherein the adhesive layer is made of a dielectric material.

6. The window insulator of claim 5 wherein the adhesive layer is made of a plasticized polymer.

7. The window insulator of claim 1 wherein the negatively charged coupling layer and a glass window with an affinity for positive charges forms an attractive force that couples the window insulator to the window.

8. The window insulator of claim 1 wherein the coupling layer is made of a plastic with an affinity for negative charges.

9. The window insulator of claim 1 wherein the dielectric medium is made of PET.

10. The window insulator of claim 1 further comprising an insulating layer bonded to the reflective layer with a layer of adhesive.

11. The window insulator of claim 10 further comprising a decorative layer bonded to the insulating layer with another layer of adhesive, the insulating layer being positioned between the reflective layer and the decorative layer.

12. The window insulator of claim 1 wherein the radiant energy is from sunlight.

13. A window insulator comprising:
    a coupling layer;
    a reflective layer; and
    a layer of dielectric material disposed between the coupling layer and the reflective layer,
    the coupling layer, the reflective layer, and the layer of dielectric material forming a capacitor that facilitates the release of electrons from the reflective layer and the transfer of the free electrons from the reflective layer to the coupling layer when the window insulator is exposed to radiant energy.

14. The window insulator of claim 13 wherein the coupling layer is made of a plastic with an affinity for negative charges.

15. The window insulator of claim 13 wherein the reflective layer is a metalized layer.

16. The window insulator of claim 13 wherein the dielectric material is PET.

17. The window insulator of claim 13 wherein the layer of dielectric material is bonded to the coupling layer with a layer of adhesive, the layer of adhesive being a dielectric.

18. The window insulator of claim 17 wherein the adhesive is made of a plasticized polymer with polyimides.

19. The window insulator of claim 13 further comprising an insulating layer bonded to the reflective layer with a layer of adhesive.

20. A window insulator comprising:
    a coupling layer;
    a dielectric layer bonded to the coupling layer with an adhesive made of a dielectric medium; and
    a reflective layer bonded to the dielectric layer, the dielectric layer being disposed between the adhesive the reflective layer,
    the coupling layer, the adhesive, the dielectric layer, and the reflective layer forming a capacitor with a positively charged reflective plate and a negatively charged coupling layer when the window insulator is exposed to radiant energy.

* * * * *